US006352681B1

(12) United States Patent
Horikawa et al.

(10) Patent No.: US 6,352,681 B1
(45) Date of Patent: Mar. 5, 2002

(54) METHOD FOR PRODUCING BARIUM TITANATE POWDER

(75) Inventors: Matsuhide Horikawa; Hideki Sakai; Wataru Kagohashi, all of Chigasaki (JP)

(73) Assignee: Toho Titanium Co., Ltd.

( * ) Notice: Subject to any disclaimer, the term of this patent is extended or adjusted under 35 U.S.C. 154(b) by 0 days.

(21) Appl. No.: 09/446,826

(22) PCT Filed: May 20, 1999

(86) PCT No.: PCT/JP99/02653

§ 371 Date: Dec. 29, 1999

§ 102(e) Date: Dec. 29, 1999

(87) PCT Pub. No.: WO99/59919

PCT Pub. Date: Nov. 25, 1999

(30) Foreign Application Priority Data

May 20, 1998 (JP) ............................ 10-139018
May 20, 1998 (JP) ............................ 10-139019

(51) Int. Cl.⁷ .................... C01F 11/00; C01G 23/00
(52) U.S. Cl. ...................................... 423/598
(58) Field of Search ........................ 423/598; 501/137

(56) References Cited

U.S. PATENT DOCUMENTS 4,520,004 A  *  5/1985  Uedaira et al. ............. 423/598
5,087,437 A  *  2/1992  Bruno et al. ................ 423/598
5,900,223 A  *  5/1999  Matijevic et al. ........... 423/598

FOREIGN PATENT DOCUMENTS

| JP | A-1-286923 | 11/1989 |
| JP | A-2-32923 | 2/1990 |
| JP | A-2-111629 | 4/1990 |
| JP | A-3-39014 | 2/1991 |
| JP | A-4-12020 | 1/1992 |
| JP | A-5-73695 | 3/1993 |
| JP | A-5-73696 | 3/1993 |
| JP | A-5-306121 | 11/1993 |
| JP | A-6-649 | 1/1994 |
| JP | 7-232923 | * 9/1995 |

* cited by examiner

*Primary Examiner*—Steven Bos
(74) *Attorney, Agent, or Firm*—Oliff & Berridge, PLC

(57) ABSTRACT

A process for production of a barium titanate powder, the process comprises adding an aqueous solution of a titanium compound and an aqueous solution of a barium compound and an alkali metal hydroxide into an alkaline solution under stirring, thereby contacting the aqueous solutions with each other while controlling the molar ratio of the titanium compound to the barium compound to be within the range of 0.8 to 1.2.

5 Claims, No Drawings

METHOD FOR PRODUCING BARIUM TITANATE POWDER

TECHNICAL FIELD

The present invention relates to a process for production of a barium titanate powder having a particle size of 1 μm or less and a crystallized Perovskite structure consisting of a spherical primary particle.

BACKGROUND ART

Barium titanate powders are widely used for dielectric materials for electronic parts such as PTC thermistors and piezoelectric devices, in particular, are suitable for substrates of multilayer ceramic capacitors. Multilayer ceramic capacitors are generally manufactured by alternately laminating a ceramic dielectric layer and an internal electrode layer, firmly pressing, and then sintering to integrate them. Barium titanate powder is slurried in a binder and is sintered to form a ceramic dielectric layer. Recently, in particular, the ceramic dielectric layer is made to be a thin laminate so as to meet the requirements of compact design and increased capacity. For such specifications, the ceramic dielectric layer must have good voltage tolerance characteristics, the barium titanate particles must not agglomerate in slurrying, and the capacity of the capacitor must be sufficiently ensured. To meet these requirements, the following characteristics are required in the barium titanate powder.

(1) The powder should consist of ultrafine particles having a uniform globular shape, and the particle size is preferably in the range of 0.05 to 0.5 μm, more preferably in the range of 0.05 to 0.3 μm, and the particle size distribution should be narrow.
(2) The powder should have good crystallinity, specifically having a Perovskite structure having a primary particle size ranging from 0.05 to 0.3 μm.
(3) The barium/titanium atomic ratio should particularly be close to 1.00, and particularly in the range of 0.99 to 1.01.
(4) The powder should have excellent dispersion characteristics when it is slurried or made into a pasted.
(5) The powder should have good sintering characteristics.

Until now, barium titanate powders have been produced by mixing titanium compounds and barium compounds, and then sintering them so as to cause a solid phase reaction. However, in such a production process, the above chemical compounds are made to react at high temperatures, and the particles of the obtained barium titanate powders become relatively large (for example, about 0.5 μm is the lower limit), the particle size distribution thereof is broad, and the shapes thereof are not uniform. Therefore, the dispersion characteristics of the barium titanate powder in the slurry is not so good. Such a broad range of particle size limits thinning of the ceramic dielectric layer. As a production process which can solve this problem, the liquid phase reaction method is known.

Various proposals have been made for this liquid phase reaction method. For example, Japanese Patent Publication No. 73695/93 discloses a production process in which titanium oxide hydrate, barium chloride and/or barium nitrate, and 2.1 to 5 moles of alkali metal hydroxide per 1 mole of the barium chloride and/or barium nitrate are reacted in 120 to 10000 moles of water per 1 mole of titanium at 60 to 110° C. Japanese Patent Publication No. 73696/93 discloses a production process in which titanium oxide hydrate, barium hydroxide, and alkali metal hydroxide are reacted in 120 to 10000 moles of water per 1 mole of titanium at 60 to 110° C. Japanese Patent Publication No. 39014/91 discloses a production process in which hydrolysis products of titanium compounds and water-soluble barium salts are reacted in strong alkali aqueous solutions. Japanese Patent Publication No. 649/94 discloses a production process in which a chloride of titanium or zirconium is hydrolyzed in an aqueous solution, then the aqueous solution is made alkali once so as to remove chlorine ions, and consecutively a water-soluble salt of barium, strontium, or calcium is added to the aqueous solution so as to react in strong alkali.

Japanese Patent Unexamined Publication No. 232923/95 discloses a production process in which a mixed aqueous solution of titanium compounds, such as titanium tetrachloride coexisting with barium salts is contacted with an alkali aqueous solution preheated at 70 to 100° C. so as to obtain approximately globular crystalline Perovskite structures.

However, in the production process in Japanese Patent Publication No. 73695/93, in addition to the long reaction time, the concentration control of the titanium oxide hydrate, control of barium/titanium atomic ratio, or control of the production process were difficult. In addition, the reaction progresses in the presence of large amounts of water of 120 to 10000 moles per 1 mole of titanium. The reaction progressing in such an extremely diluted system causes decreases in production efficiency, requires production facilities of large design, and large amounts of waste water to be treated. These problems are very similar in the production process of Japanese Patent Publication Nos. 73696/93 and 39014/91. The production process in Japanese Patent Publications No. 649/94 requires the process for restoring alkali conditions after hydrolyzing the chloride of titanium or zirconium in the aqueous solution, and the complicated processes and long periods for executing the process are required.

In particular, the solubility of the barium salt, such as barium chloride, is low in the acid phase. Therefore, in the production process in Japanese Patent Unexamined Publication No. 232923/5, the mixed acidic aqueous solution of the titanium compound and the barium salt is used for the starting material, and it is difficult to adjust the mixed aqueous solution. In particular, there is an upper limit to the concentration of the titanium compound and the barium salt in a mixed aqueous solution. In particular, when the mixed aqueous solution of titanium tetrachloride and barium chloride is prepared, the total concentration of the metal ion is limited to 1.2 moles per liter, and that the production efficiency is therefore limited. Furthermore, if the carbonate is contaminated in the starting material solution, control of the barium/titanium atomic ratio becomes difficult, and the carbonate is contaminated in the final product powder, decreasing the quality. This result in a problem in that the powder must be sintered to increase the dielectric constant.

In addition, although the barium titanate produced by the above conventional process is a fine particle, the dispersion characteristics in slurry is not so good. Therefore, the particles eventually agglomerate, *and thinning of the ceramic dielectric layer is difficult.

DISCLOSURE OF THE INVENTION

It is an object of the present invention to provide a production process for barium titanate powder which can satisfy the above requirements (1) to (5) by a remarkably simplified process, so as to solve the problems in production efficiency.

The inventors have conducted research for a production process which can achieve the above objects. As a result, they discovered that the target barium titanate powder can be produced at low temperature by a simple process in which a titanium compound and a barium compound are prepared in separate aqueous solutions of strong alkali and are instantaneously and continuously brought into contact with each other while being stirred. They also discovered that superior barium titanate powder can be obtained by contacting the titanium compound aqueous solution and the barium compound aqueous solution with each other while the titanium compound/barium compound molar ratio is controlled to be in the range of 0.8 to 1.2.

The present invention has been completed according to the above knowledge. The invention provides a process for production of a barium titanate powder by contacting an aqueous solution of titanium compound (referred to simply as "aqueous solution (I)" hereinafter) with an alkali aqueous solution of barium compound (referred to simply as "aqueous solution (II) hereinafter) while controlling the molar ratio of titanium compound barium compound to be within the range of 0.8 to 1.2 and stirring.

As titanium compounds in the invention, one or more compounds chosen from the group consisting of halides, hydroxides, nitrates, sulfates, acetates, perchlorates, oxalates, and alkoxides may be employed. As specific chemical compounds, titanium tetrachloride, titanium trichloride, titanium hydroxide, and titanyl sulfate may be mentioned. Among these compounds, titanium tetrachloride is preferably used.

As barium compounds, one or more compounds chosen from the group consisting of halides, hydroxides, nitrates, sulfates, acetates, perchlorates, oxalates and alkoxides may be employed. As specific chemical compounds, barium chloride, barium hydroxide, barium nitrate, barium sulfate, barium acetate, etc., may be employed. Among these compounds, barium chloride and barium hydroxide are preferably used. Alternatively, halides such as barium chloride, and barium salt compounds such as nitrates, sulfates and acetates may be beforehand brought into contact with hydroxides such as NaOH or KOH which are obtained from alkali metals, and they are reacted by heating, thereby obtaining refined barium hydroxide, which may used.

One or more kinds of the above titanium compounds and the barium compounds may be used in combination. Although the combination is optional, the following combinations are preferable for the invention.

(1) Titanium tetrachloride and barium chloride
(2) Titanium tetrachloride and barium hydroxide
(3) Titanium tetrachloride, barium chloride, and barium hydroxide
(4) Titanium tetrachloride, titanium trichloride, and barium chloride
(5) Titanium tetrachloride, titanium trichloride, barium chloride, and barium hydroxide

BEST MODE FOR CARRYING OUT THE INVENTION

Preferable embodiments according to the above-mentioned production process, in which titanium tetrachloride is used for the titanium compound, will be explained hereinafter. In the production process, a titanium tetrachloride aqueous solution (I) for titanium tetrachloride, and a barium compound (one or more kinds chosen from the group consisting of halides, hydroxides, nitrates, sulfates, acetates, perchlorates, oxalates, and alkoxides) alkali aqueous solution (II) are separately prepared in holding vessels. The aqueous solutions (I) and (II) are then mixed while being stirred. Aqueous solutions (I) and (II) are adjusted as follows.

(1) Titanium Tetrachloride Aqueous Solution (I)
[Titanium Tetrachloride Concentration]

Titanium tetrachloride concentration of the titanium tetrachloride aqueous solution (I) is 0.1 mol/l or more, preferably in the range of 0.4 to 3.0 mol/l, and more preferably in the range of 0.4 to 3.0 mol/l for improving purity. The titanium tetrachloride concentration is preferably higher for improving productivity since the reaction rate is extremely low below 0.1 mol/l. In the invention, the aqueous solution of a single titanium compound like titanium tetrachloride is used, so that the concentration of the raw material aqueous solution can be higher, thereby improving productivity.

[Temperature]

The temperature of the titanium tetrachloride aqueous solution (I) is preferably maintained in the range of 30 to 90° C. by preheating, and more preferably in the range of 40 to 50° C. If the temperature of the aqueous solution (I) exceeds 60° C., the titanium tetrachloride hydrolyzes and solid components precipitate. As a result, a uniform aqueous solution cannot be obtained, and control of the barium/titanium atomic ratio of the product becomes difficult.

[Water Used For Titanium Tetrachloride Aqueous Solution (I)]Deionized water, treated with using an ion-exchange resin, is preferably used for the titanium tetrachloride aqueous solution (I), and more preferably, dissolved gases such as carbon dioxide in the water are also removed. The titanium tetrachloride aqueous solution (I) is preferably dehydrochlorinated by means of bubbling argon gas therethrough before it contacts the barium compound alkali aqueous solution (II). For the treatment, the chlorine content in the obtained barium titanate powder can be reduced.

The titanium tetrachloride aqueous solution (I) is preferably held without contact with air. More preferably, the dissolved gases in the titanium tetrachloride aqueous solution (I) may be removed before the reaction. If the removal of gas is insufficient, foaming occurs in the liquid phase in the reaction, and the shapes of the particles generated are not uniform.

(2) Barium Compound Alkali Aqueous Solution (II)
[Barium Concentration]

The barium ion concentration of the barium compound alkali aqueous solution (II) is preferably 0.05 mol/l or more, and is more preferably in the range of 0.1 to 2.0 mol/l. The barium ion concentration is preferably higher for improvement in productivity since the reaction rate is extremely low below 0.05 mol/l. For example, although the upper limit of the solubility of barium chloride is about 1.2 mol/l, the solubility changes to less than one-half thereof when the solution is a mixed solution with the titanium compound. If solubility is excessively increased, the solution is not uniform and the reaction is not uniform. Thus, in the invention, by separately preparing the barium compound aqueous solution and the titanium compound aqueous solution, and by using them as raw material aqueous solutions, the barium ion concentration can be high in a manner similar to the above aqueous solution (I), thereby improving productivity.

[Alkali Concentration]

Hydroxides such as NaOH or KOH and the like, obtained from alkali metals are used as the alkali sources for the barium compound alkali aqueous solution (II). The alkali concentration of the aqueous solution (II) is normally in the range of 0.2 to 15 mol/l, and preferably is at a concentration sufficient to convert the above barium compounds into hydroxides; that is, the concentration should be equal to or greater than the barium ion concentration. Thus, the barium compound is mixed with the alkali compound beforehand, so that halides such as barium chloride, and barium salt compounds such as nitrates, sulfates, acetates are first converted into barium hydroxide, and are then mixed and react with the titanium compound aqueous solution (I). In methods in which a titanium tetrachloride aqueous solution and a barium chloride aqueous solution are contacted and mixed with each other simultaneously in an alkali aqueous solution, alternatively, a mixed aqueous solution of a titanium tetrachloride aqueous solution and a barium chloride aqueous solution is added to an alkali aqueous solution for a catalytic reaction, and the chlorine portion readily remains in the barium titanate of the reaction product. According to the invention, the barium compound is prepared beforehand as an alkali aqueous solution and is converted to a hydroxide, so that the reaction thereof with the titanium compound progresses more uniformly, and barium titanate which has less chlorine and higher purity can be produced.

In addition, barium hydroxide may be used as an alkali source without using the above hydroxide obtained from the alkali metal. That is, in aqueous solution (II), the barium compound may be prepared from only barium hydroxide; alternatively, it may be prepared from barium hydroxide and barium compounds such as barium chloride except for barium hydroxide. Thus, the titanium compound aqueous solution (I) and the aqueous solution (II) of the barium compound and the barium hydroxide are contacted with each other, whereby barium titanate is produced. For this process, contamination by metal impurities is prevented since metal components except for titanium and barium are not used, so that barium titanate of higher purity can be produced.

[Temperature]

The temperature of the barium compound alkali aqueous solution (II) is preferably maintained in the range of 80 to 100° C. by preheating, and more preferably maintained at approximately the same temperature as the actual reaction system by preheating, so that the reaction with the titanium tetrachloride aqueous solution (I) is accelerated. The reaction temperature is preferably maintained approximately constant by restricting temperature fluctuation within ±1° C. during reaction of the aqueous solutions (I) and (II), so that the barium/titanium atomic ratio of the obtained barium will be stable.

[Water Used For Barium Compound Alkali Aqueous Solution]

Deionized water treated with using an ion-exchange resin is preferably used for the barium compound alkali aqueous solution (II), and more preferably, dissolved gases such as carbon dioxide in the water may be removed.

[Filtration Treatment]

Although the barium compound alkali aqueous solution (II) obtained by the above method can be used as it is, the aqueous solution (II) is preferably filtered in advance, so that the barium/titanium atomic ratio can be easily controlled and higher purity can effectively be obtained. For example, when NaOH is used as an alkali source, sodium carbonate in NaOH as an impurity reacts with the barium compound, and barium carbonate precipitates. Since the precipitated barium carbonate contaminates barium titanate powder in the reaction, it is preferably removed beforehand by the filtering. In contrast, in the conventional method, a mixed solution of a titanium compound and a barium compound is added to an alkali aqueous solution. Alternatively, a titanium compound aqueous solution and a barium compound aqueous solution are individually added to an alkali aqueous solution, or both the aqueous solutions are mixed with each other to be added to an alkali aqueous solution. Compared to the conventional methods, the method of the invention, in which a barium compound alkali aqueous solution and a titanium compound aqueous solution are separately prepared and contacted with each other, can yield barium titanate of higher purity, The barium compound alkali aqueous solution (II) described above is preferably held while avoiding contact with air in a manner similar to the titanium tetrachloride aqueous solution (I). The barium compound alkali aqueous solution (II) is preferably degased prior to the reaction.

Next, a method in which the above aqueous solutions (I) and (II) are contacted with each other will be explained hereinafter.

First, the alkali concentration of the aqueous solution (II) is adjusted so that the pH during contact and reaction is 13 or more, preferably 13.5 or more, and more preferably 13.8 or more. In order to maintain the above predetermined pH value during the reaction, an alkali aqueous solution such as a NaOH aqueous solution may be supplied at a necessary feed rate from an optional supply system. An alkali aqueous solution which is adjusted to a predetermined concentration may preferably be charged into a reaction vessel in advance, and then the aqueous solutions (I) and (II) are added thereto to contact with each other. The alkali aqueous solution is preferably preheated to the reaction temperature, and is alternatively preheated to a temperature higher than the reaction temperature so that the temperature of all of solution will be adjusted to the reaction temperature after the aqueous solutions (I) and (II) are added. Thus, the pH value in the reaction is maintained constant, so that a uniform reaction is maintained. As a result, uniform barium titanate having a controlled barium/titanium ratio is produced.

In addition, the molar ratio of the titanium compound/barium compound is preferably controlled in the range of 0.8 to 1.2 when the aqueous solutions (I) and (II) are contacted and reacted with each other. Not only the molar ratio, but also the absolute concentration in the reaction system of the titanium compound or the barium compound, is preferably maintained to be as constant as possible from the initiation of the reaction to the completion of the reaction, so that the reaction proceeds uniformly. In a method in which the alkali aqueous solution is charged into the reaction vessel in advance, and then the aqueous solutions (I) and (II) are added thereto, the concentrations of the titanium compound and the barium compound are diluted in the initial stage of the reaction. A reaction under diluted conditions results in a barium/titanium atomic ratio in which the amount of barium titanate is too low. Therefore, the barium compound used beforehand in the aqueous solution (II) or the titanium compound used beforehand in the aqueous solution (I) is added to the alkali aqueous solution in the reaction vessel. In particular, the concentration of the barium compound affects the barium/titanium atomic ratio in the barium titanate produced. Therefore, the barium compound is preferably added to the alkali aqueous solution in the reaction vessel, as mentioned above.

Next, the aqueous solutions (I) and (II) are supplied from the holding vessel to the reaction vessel via pipes by means of pumps, and are stirred and contacted with each other. In this condition, the aqueous solutions (I) and (II) are instantaneously and continuously supplied into the reaction vessel at a constant feed rate, so that the molar ratio of titanium compound/barium compound is adjusted to be in the range of 0.8 to 1.2, preferably in the range of 1.0 to 1.2, and more preferably in the range of 1.07 to 1.12. The aqueous solutions (I) and (II) should be stirred by an agitator provided in the reaction vessel when they are supplied into the reaction vessel. If no agitator is provided, eddy flow may be generated by line mixing and the like, so that the aqueous solutions (I) and (II) are mixed and contacted uniformly after being supplied.

The reaction temperature during contact and reaction of the aqueous solutions (I) and (II) is preferably set in the range of 80 to 100° C., more preferably in the range of 85 to 95° C., and is controlled to be approximately constant within ±1° C. of the set temperature.

The aqueous solutions (I) and (II) are contacted with each other in the reaction vessel, and stirred for a sufficient time (a few seconds to 20 minutes) so that particulate barium titanate is produced. The produced barium titanate may be continuously extracted as a slurry (continuous reaction), or may be alternatively removed after the reaction in the reaction vessel (batch reaction) is completed.

The thus produced barium titanate is preferably treated with a heat treatment in the slurry condition after the reaction (aging reaction). The temperature of the heat treatment is normally in the range of 80 to 100° C. which is the same as the reaction temperature, or at a higher temperature in the range of 100 to 200° C. The period for heat treatment is normally in the range of 1 minute to 10 hours, and is preferably in the range of 1 minute to 1 hour. By the heat treatment, unreacted titanium compounds and unreacted barium compounds will completely react, and the crystallinity of the particles is improved by the heat treatment of the particles. As a specific method, the slurry including the produced barium titanate is treated at a predetermined temperature for a predetermined period in the reactor, or in an aging tank to which the slurry is transferred from the reaction vessel. After the heat treatment, the barium titanate is washed, unreacted chemical compounds and the alkaline component, and byproducts of alkali salts are sufficiently removed, thereby isolating barium titanate. General methods such as decanting, centrifugal --separation, or filtering can be adopted for the washing and the isolation. After the isolation, the barium titanate is dried by heating in air or in inert gas at a temperature in the range of 50 to 300° C., or alternatively in vacuum at a temperature in the range of 20 to 300° C., so that the alkaline components are ultimately removed, and the barium titanate powder is refined.

Additionally in the invention, the barium titanate powder produced by the above process may be heated to a temperature in the range of 1000 to 1300° C. By this heating, a barium titanate powder having superior crystallinity and high purity can be obtained.

The barium titanate powder thus produced consists of particles having a uniform globular shape. The powder has a particle size in the range of 0.05 to 0.5 μm, preferably in the range of 0.05 to 0.3 μm, has a narrow particle size distribution, and has superior crystallinity. The Ba/Ti atomic ratio of the powder is in the range of 0.99 to 1.01, which is very close to 1. Furthermore, the dispersion characteristics of the powder in slurrying is superior, and it is therefore highly suitable as a material for dielectric layers in multi-layer ceramic capacitors. In addition, the invention provides a simple production process in which a titanium compound, such as titanium tetrachloride, and a barium compound, such as barium chloride, are prepared in separate aqueous solutions for starting materials, and they are instantaneously and continuously brought into contact with each other while being stirred, thereby improving productivity.

Examples of the invention will be explained hereinafter.

EXAMPLE 1

A. Production of Barium titanate powder

A flask with a stirring device and a capacity of 2000 cc made by stainless steel was provided as a reaction vessel. A NaOH aqueous solution with a concentration of 0.92 mol/l was charged beforehand into the reaction vessel, and the NaOH aqueous solution was maintained at about 90° C.

A $TiCl_4$ aqueous solution (using ion-exchanged water; $TiCl_4$ concentration of 0.472 mol/l) which was heated and held at 40° C., and a $BaCl_2$/NaOH aqueous solution (using ion-exchanged water; $BaCl_2$ concentration of 0.258 mol/l; NaOH concentration of 2.73 mol/l) from which the undissolved portion was removed and which was heated and maintained at about 95° C. were prepared. These aqueous solutions were continuously supplied by pumps into the reaction vessel at a feed rate of the $TiCl_4$ aqueous solution of 77 cc/min and a feed rate of the $BaCl_2$/NaOH aqueous solution of 151 cc/min. In this procedure, the molar ratio of $TiCl_4$/$BaCl_2$ was 1.07. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the $TiCl_4$ aqueous solution and the $BaCl_2$/NaOH aqueous solution. Then, the pump was stopped and the slurry was stirred for 5 minutes. Next, decanting was performed in the aging tank so as to separate the supernatant and the sediment, and centrifugal separation was carried out. Then, pure water washing, decanting and centrifugal separation were performed several times, and barium titanate powder was recovered. The recovered barium titanate powder was dried by being heated in air at 100° C., and barium titanate powder according to Example 1 was obtained.

B. Measurements For Physical Properties of Barium Titanate Powder (1) Average Particle Size, CV Value The average particle size of the obtained barium titanate powder was measured by electron micrography (SEM diameter), and based on this, the CV value (a ratio of standard deviation of the particle size to average particle size) was obtained.

(2) Zeta-potential

The slurry of barium titanate powder was prepared, and the zeta-potential thereof in this condition was measured by the following method based on the laser Doppler method. That is, DELSA 440SX provided by CouHer Co. was used as the zeta-potential measuring instrument. A sample of the barium titanate powder was suspended in distilled water beforehand so as to adjust the concentration to 0.005 weight % at pH 6.4. Then, it was vibrated for 3 minutes by ultrasonic waves, and was charged into a measuring cell of the above measuring instrument. The zeta-potential was measured, after the cell temperature was stabilized within the range of 25±0.2° C.

(3) Barium/titanium Atomic Ratio

The barium/titanium atomic ratio (Ba/Ti ratio) of the obtained barium titanate powder was analyzed by the following method. That is, with respect to barium, the sample was decomposed by adding sulfuric acid, ammonium sulfate, and nitric acid, and was dissolved by adding water. Then, the barium component in the sample was precipitated as barium sulfate, and the solution was filtered. The remainder of the sample was incinerated, ignited, and cooled, and then the barium sulfate was weighed to determine the quantity of barium. In the meantime, with respect to titanium, the sample was decomposed by adding sulfuric acid, ammonium sulfate, and nitric acid, and was dissolved by adding water Hydrochloric acid and sulfuric acid were added to the sample, then titanium (IV) was reduced with metallic aluminum. After cooling the sample, an ammonium sulfate iron (III) standard solution was titrated to the sample using an ammonium thiocyanate solution as an indicator so as to determine the quantity of titanium.

(4) Dispersion Characteristics

In order to confirm the dispersion characteristics of the obtained barium titanate powder, the barium titanate powder was suspended in water, and the average particle size was measured by a laser light scattering method particle size measuring instrument, LA700 (made by HORIBA), and it was compared to the SEM diameter measured in the above.

EXAMPLE 2

A flask with a stirring device and a capacity of 2000 cc made by stainless steel was provided as a reaction vessel. A NaOH aqueous solution with a concentration of 0.77 was charged beforehand into the reaction vessel, and the NaOH aqueous solution was maintained at about 90° C.

A $TiCl_4$ aqueous solution (using ion-exchanged water; $TiCl_4$ concentration of 0.466 mol/l) which was heated and held at 40° C., and a $Ba(OH)_2$/NaOH aqueous solution (using ion-exchanged water; $Ba(OH)_2$ concentration of 0.264 mol/l; NaOH concentration of 2.09 mol/l) from which the undissolved portion was removed and which was heated and maintained at about 95° C. were prepared. These aqueous solutions were continuously supplied by a pump into the reaction vessel at a feed rate of the $TiCl_4$ aqueous solution of 80 cc/min and a feed rate of a $Ba(OH)_2$/NaOH aqueous solution of 158 cc/min. In this procedure, the molar ratio of $TiCl_4$/$Ba(OH)_2$ was 1.11. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the $TiCl_4$ aqueous solution and the $Ba(OH)_2$/NaOH aqueous solution. Then, the pump was turned off and the slurry was stirred for 5 minutes in the aging tank. Next, decanting was performed in the aging tank so as to separate the supernatant and the sediment, and centrifugal separation was performed. Then, pure water washing, decantation and centrifugal separation were performed several times, and barium titanate powder was recovered. The recovered barium titanate powder was dried by heating in air at 100° C., and the barium titanate powder according to Example 2 was obtained.

The physical characteristics of the barium titanate powder obtained were measured in the same way as in Example 1, and the results thereof are shown together in Table 1.

EXAMPLE 3

A barium titanate powder according to Example 3 was obtained by the same process as in Example 4, except that a $TiCl_4$ aqueous solution with a $TiCl_4$ concentration of 2.25 mol/l was supplied at a feed rate of 100 cc/min and a $BaCl_2$/NaOH aqueous solution with a $BaCl_2$ concentration of 1.25 mol/l and a NaOH concentration of 8.3 mol/l was supplied at a feed rate of 200 cc/min. The physical characteristics of the barium titanate powder obtained were measured in the same way as in Example 1, and the results thereof are shown together in Table 1.

Comparative Example 1

A flask with a stirring device and a capacity of 2000 cc made by stainless steel was provided as a reaction vessel. A NaOH aqueous solution with a concentration of 0.92 was charged beforehand into the reaction vessel, and the NaOH aqueous solution was maintained at about 90° C.

A $TiCl_4$ aqueous solution (using ion-exchanged water; $TiCl_4$ concentration of 0.472 mol/l) which was heated and held at 40° C., and a $BaCl_2$ aqueous solution (using ion-exchanged water; $BaCl_2$ concentration of 0.258 mol/l) from which the undissolved portion was removed and which was heated and maintained at about 95° C. were mixed so as to prepare a $TiCl_4$/$BaCl_2$ mixed aqueous solution. Then, the mixed aqueous solution was continuously supplied by a pump into the reaction vessel at a feed rate of 77 cc/min. In this procedure, the temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by pump at a feed rate of 77 cc/min. Then, the pump was turned off and the slurry was stirred for 5 minutes. Next, decanting was performed in the aging tank so as to separate the supernatant and the sediment, and centrifugal separation was carried out. Then, pure water washing, decantation, and centrifugal separation were performed several times, and barium titanate powder was recovered. The recovered barium titanate powder was dried by heating in air at 100° C., and barium titanate powder according to Comparative Example 1 was obtained.

The physical characteristics of the barium titanate powder obtained were measured in the same way as in Example 1, and the results thereof are shown together in Table 1.

Comparative Example 2

A barium titanate powder according to Comparative Example 2 was obtained by the same process as in Comparative Example 1, except that a $TiCl_4$ aqueous solution (using ion exchanged water; $TiCl_4$ concentration of 2.25 mol/l) and a $BaCl_2$ aqueous solution (using ion-exchanged water; $BaCl_2$ concentration of 2.5 mol/l) were mixed to water; $BaCl_2$ concentration of 2.5 mol/l) were mixed to prepare a mixed aqueous solution. The physical characteristics of the barium titanate powder obtained were measured in the same way as in Example 1, and the results thereof are shown together in Table 1.

Comparative Example 3

A flask with a stirring device and a capacity of 2000 cc made by stainless steel was provided as a reaction vessel. A NaOH aqueous solution with a concentration of 0.92 was charged beforehand into the reaction vessel, and the NaOH aqueous solution was maintained at about 90° C.

A $TiCl_4$ aqueous solution (using ion-exchanged water; $TiCl_4$ concentration of 0.472 mol/l) which was heated and held at 40° C., and a $BaCl_2$ aqueous solution (using ion-exchanged water; $BaCl_2$ concentration of 0.258 mol/l) from which the undissolved portion was removed and which was heated and maintained at about 95° C. were prepared. These aqueous solutions were continuously supplied by a pump into the reaction vessel at a feed rates of the $TiCl_4$ aqueous solution of 77 cc/min and a feed rate of the $BaCl_2$ aqueous solution of 151 cc/min. The temperature of the mixed aqueous solution in the reaction vessel was adjusted to be constant at about 90° C., and the mixed aqueous solution was stirred for 2 minutes so as to obtain particulate barium titanate. Then, the slurry including the produced barium titanate was continuously extracted from the reaction vessel and sent to an aging tank which was maintained at about 90° C. by a pump at the total feed rate of the $TiCl_4$ aqueous solution and the $BaCl_2$ aqueous solution. Then, the pump was stopped and the slurry was stirred for 5 minutes. Next, decanting was performed in the aging tank so as to separate the supernatant and the sediment, and centrifugal separation was performed. Then, pure water washing, decanting and centrifugal separation were performed several times, and barium titanate powder was recovered. The recovered barium titanate powder was dried by heating in air at 100° C., and the barium titanate powder according to Comparative Example 3 was obtained.

The physical characteristics of the barium titanate powder obtained were measured in the same way as in Example 1, and the results thereof are shown together in Table 1.

TABLE 1

|  | Examples | | | Comparative Examples | | |
| --- | --- | --- | --- | --- | --- | --- |
|  | 1 | 2 | 3 | 1 | 2 | 3 |
| CV Value (Standard Deviation/ Median Diameter) | 21 e | 24 | 25 | 35 | 40 | 45 |
| SEM Diameter ($\mu$m) | 0.18 | 0.19 | 0.21 | 0.15 | 0.25 | 0.22 |
| Zeta-Potential (mV) | −48 | −45 | −48 | −20 | −22 | −24 |
| Ba/Ti Atomic Ratio | 1.002 | 0.995 | 1.001 | 0.989 | 0.972 | 0.985 |
| Average Particle Size by Laser Light Scattering Method ($\mu$m) | 0.50 | 0.55 | 0.57 | 0.70 | 0.75 | 0.80 |

As is clearly shown in Table 1, in the barium titanate powder according to the invention, the particle size distribution is narrow since the CV value is small compared to that of conventional barium titanate powders. Furthermore, dispersion characteristics are superior to the conventional barium titanate powder since the zeta-potential is low and the difference between the SEM diameter and the average particle size as measured by the laser light scattering method is small, and the Ba/Ti ratio is extremely close to 1. Therefore, the advantages of the invention were confirmed by these results.

As described above, according to the production process for barium titanate powders of the invention, powders can be easily produced with improved productivity, the powders having fine particle size and narrow particle size distribution, and having superior dispersion characteristics and Ba/Ti atomic ratio, and the powders being extremely promising as materials for ceramic dielectric layers in multilayer ceramic capacitors.

What is claimed is:

1. A process for production of a barium titanate powder, the process comprising adding 1) a first aqueous solution of a titanium compound selected from the group consisting of halides, hydroxide, nitrate, sulfate, acetate, perchlorate and oxalate, and 2) a second aqueous solution of a barium compound and an alkali metal hydroxide into an alkaline aqueous solution under stirring, thereby contacting the first and second aqueous solutions with each other in the alkaline solution, while controlling the molar ratio of the titanium compound to the barium compound to be within the range of 0.8 to 1.2.

2. A process for production of a barium titanate powder according to claim 1, wherein the barium compound is at least one compound selected from the group consisting of halides, hydroxide, nitrate, sulfate, acetate, perchlorate, oxalate and alkoxides.

3. A process for production of a barium titanate powder according to claim 1, wherein the titanium compound is a titanium halide.

4. A process for production of a barium titanate powder according to claim 1, wherein the titanium compound is titanium tetrachloride.

5. A process for production of a barium titanate powder according to claim 1, wherein the barium compound is at least one of barium chloride and barium hydroxide.

* * * * *

UNITED STATES PATENT AND TRADEMARK OFFICE
CERTIFICATE OF CORRECTION

PATENT NO. : 6,352,681 B1
DATED : March 5, 2002
INVENTOR(S) : Matsuhide Horikawa, Hideki Sakai and Wataru Kagohashi It is certified that error appears in the above-identified patent and that said Letters Patent is hereby corrected as shown below:

<u>Title page,</u>
Item [54], change "METHOD FOR PRODUCING BARIUM TITANATE POWDER" to -- PROCESS FOR PRODUCTION OF BARIUM TITANATE POWDER --.

Signed and Sealed this

Twenty-seventh Day of August, 2002

Attest:

JAMES E. ROGAN
Attesting Officer
Director of the United States Patent and Trademark Office